(12) United States Patent
Chen et al.

(10) Patent No.: US 8,059,968 B2
(45) Date of Patent: Nov. 15, 2011

(54) MODULATION DEVICE FOR GENERATING OPTICAL SIGNAL WITH QUADRUPLE FREQUENCY AND METHOD THEREOF

(75) Inventors: Jye Hong Chen, Jhubei (TW); Chun-Ting Lin, Taichung (TW); Po Tsung Shih, Tainan (TW); Peng-Chun Peng, Jhonghe (TW); Sheng Peng Dai, Guanyin Township, Taoyuan County (TW); Wen Qiang Xue, Jiading Township, Kaohsiung County (TW); Sien Chi, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 738 days.

(21) Appl. No.: 12/115,724

(22) Filed: May 6, 2008

(65) Prior Publication Data

US 2009/0214213 A1 Aug. 27, 2009

(30) Foreign Application Priority Data

Feb. 22, 2008 (TW) .............................. 97106290 A

(51) Int. Cl.
*H04B 10/04* (2006.01)
(52) U.S. Cl. .......... 398/183; 398/79; 398/186; 398/187; 398/188
(58) Field of Classification Search .................. 398/183, 398/185, 187, 188, 79, 186, 150, 140
See application file for complete search history.

(56) References Cited

U.S. PATENT DOCUMENTS

| | | | |
|---|---|---|---|
| 6,917,633 B2 | 7/2005 | Kim et al. | |
| 6,970,654 B1 | 11/2005 | Paglione et al. | |
| 7,068,886 B2 | 6/2006 | Oh et al. | |
| 7,200,343 B2 * | 4/2007 | Ikeuchi | 398/198 |
| 7,266,306 B1 * | 9/2007 | Harley et al. | 398/182 |
| 7,366,423 B2 * | 4/2008 | Levy et al. | 398/164 |
| 7,509,056 B2 * | 3/2009 | Le Meur et al. | 398/183 |
| 7,577,367 B2 * | 8/2009 | Way | 398/183 |
| 7,817,923 B2 * | 10/2010 | Akiyama et al. | 398/188 |
| 7,853,153 B2 * | 12/2010 | Kawanishi et al. | 398/183 |
| 7,899,338 B2 * | 3/2011 | Hashimoto et al. | 398/198 |
| 7,936,996 B2 * | 5/2011 | Kawanishi et al. | 398/186 |
| 7,957,653 B2 * | 6/2011 | Kawanishi et al. | 398/188 |
| 2002/0141027 A1 * | 10/2002 | LaGasse et al. | 359/237 |
| 2007/0212075 A1 * | 9/2007 | Yin | 398/183 |

OTHER PUBLICATIONS

Guohua Qi et al, "Generation and Distribution of a Wide-Band Continuously Tunable Millileter-Wave Signal With an Optical External Modulation Technique" 2005,pp. 3090-3097, vol. 53, IEEE Trans. Microwave Theory and Technol.
A. Wiberg et al, "Microwave-photonic frequency multiplication utilizing optical four-wave mixing and fiber Bragg gratings," Jan. 2006, pp. 329-334, vol. 24, No. 1, j. Lightw. Technol.
Q. Wang et al,"Millimeter_Wave Frequency Tripling Based on Four-Wave Mixing in a Semiconductor Optical Amplifier," 2006, pp. 2460-2462, vol. 18, No. 23, IEEE photonics Technology Letters.
C.T. Lin et al, "Simultaneous Generation of Baseband and Ratio Signals Using Only One Single-Electrode Mach-Zehnder Modulator With Enhanced Linearity," 2006, pp. 2481-2483, vol. 18, No. 23, IEEE Photonics Technology Letters.

* cited by examiner

*Primary Examiner* — Kenneth Vanderpuye
*Assistant Examiner* — Hibret Woldekidan
(74) *Attorney, Agent, or Firm* — Rosenberg, Klein & Lee

(57) ABSTRACT

The present invention discloses a modulation device for generating an optical signal with quadruple frequency and the modulation method thereof. The modulation device in the present invention utilizes a commercial integrated modulator, a RF signal generator and a phase shifter to generate an optical signal with quadruple frequency. When the RF signal generator generates a first modulation signal, and the phase shifter shifts the first modulation signal by 90 degrees to generate a second modulation signal, the integrated modulator is biased to transmit the optical signal in maximum value and to modulate the first and second modulation signal so as to generate a output optical signal with quadruple frequency.

19 Claims, 4 Drawing Sheets

MODULATION DEVICE FOR GENERATING OPTICAL SIGNAL WITH QUADRUPLE FREQUENCY AND METHOD THEREOF

BACKGROUND OF THE INVENTION

1. Field of the Invention

The invention relates to a modulation technique, and more particularly, to a modulation device for generating an optical signal with quadruple frequency and the modulation method thereof.

2. Description of the Related Art

The generation and transmission of millimeter-wave signals over an optical fiber have been intensively investigated for various applications, such as broad-band wireless access networks, radio over fiber (RoF), phase-array antennas, optical sensors, antenna remoting, and radars. The advantages of using millimeter-wave technology lie in the almost unlimited bandwidth and very low propagation loss. With the accelerated development of wireless communications, efficient and cost effective methods of generating and transmitting millimeter-wave signals are of utmost importance.

However, the traditional generation of optical millimeter-wave signals remains a major challenge in various optical fiber-supported systems. Limited by the frequency response of the regular modulator, and the electrical components and equipment, such as amplifiers, mixers, and synthesizers, are very expensive. Therefore, the cost effective generation of millimeter-wave signals is of great interest for various applications. Numerous optical millimeter-wave signals generation schemes based on frequency multiplication using modulators combined with optical filtering have recently been demonstrated. Nonetheless, these proposed systems are either very complex, suffer from low conversion efficiency and low signal-noise-ratio (SNR) or need more than one optical filter to remove undesired optical sidebands. The unavoidable optical filtering severely hinders the implementation of wavelength-division-multiplexer (WDM) RoF systems.

Therefore, to solve the above-mentioned problems, the present invention proposes a novel modulation device and method thereof for generating the optical signal with quadruple frequency. The present invention requires only a single integrated modulator to generate the optical signal, which simplifies the structure of circuit and dramatically reduces the total manufacturing cost.

SUMMARY OF THE INVENTION

It is therefore one of the many objectives of the claimed invention to provide a modulation device for generating an optical signal with quadruple frequency by utilizing a single integrated modulator and the modulation method thereof.

Another objective of the claimed invention is to provide a modulation device and modulation method thereof to improve the signal-to-noise ratio (SNR).

Another objective of the claimed invention is to provide a modulation device and modulation method thereof to simplify the structure of the related art circuit and dramatically reduces the total manufacturing cost.

According to the claimed invention, a modulation device for generating an optical signal with quadruple frequency is disclosed. The modulation device comprises: an electrical signal generator for generating a first modulation signal and a second modulation signal, wherein the phase difference between said first modulation signal and said second modulation signal is 90 degree; an optical signal generator for generating a optical signal; and a first integrated modulator for receiving said optical signal and modulating said optical signal to a first output optical signal with multiple frequency. The first integrated modulator comprises: a first modulation unit for receiving said optical signal and said first modulation signal, and modulating said optical signal according to said first modulation signal while said first modulation unit is biased to transmit said optical signal in maximum value; a second modulation unit for receiving said optical signal and said second modulation signal, and modulating said optical signal according to said second modulation signal while said first modulation unit is biased to transmit said optical signal in maximum value; and a third modulation unit for receiving said first modulation signal and said second modulation signal, and generating said first output optical signal with multiple frequency while said third modulation unit is biased to transmit said first optical signal and said second optical signal in minimum value.

Also according to the claimed invention, a modulation method for generating an optical signal with quadruple frequency is disclosed. The modulation method comprises: receiving and transmitting an optical signal in maximum value, and modulating said optical signal according to a first modulation signal and a second modulation signal, which had 90 degrees phase difference with said first modulation signal, to generate a first optical signal and a second optical signal respectively; and transmitting said first optical signal and said second optical signal in the minimum value to generate a first output optical signal with quadruple frequency.

Below, the embodiments of the present invention are described in detail in cooperation with the attached drawings to make easily understood the objectives, technical contents, characteristics and accomplishments of the present invention.

DETAILED DESCRIPTION OF THE INVENTION

Along with the vigorous development of wireless communications, efficient and cost effective methods of generating and transmitting microwaves and millimeter-wave signals over an optical fiber are of utmost importance. The advantages of using millimeter-wave technology lie in the almost unlimited bandwidth and very low propagation loss. However, the generation of optical millimeter-wave signals is always limited by the frequency response of regular modulator and the cost of electrical components. The present invention proposes a novel frequency quadrupling approach that can generate the optical signals by utilizing a single commercial integrated modulator. The frequency quadrupling technique in the present invention can be intensively investigated for various applications, such as broad-band wireless access networks, radio over fiber (RoF), phase-array antennas, optical sensors, antenna remoting, and radars.

Figure 1:
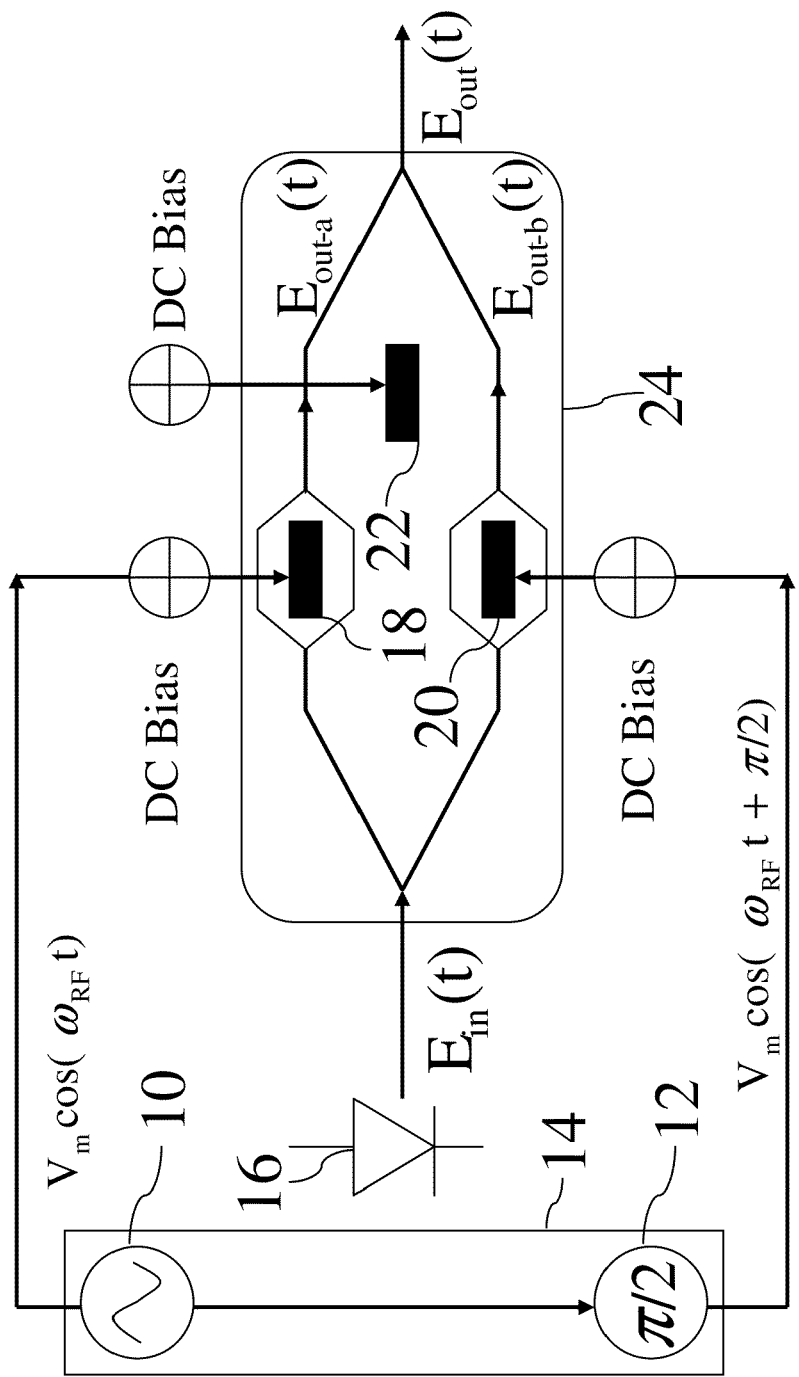
FIG. 1 is a block diagram of a modulation device according to a first embodiment of the present invention.

Please refer to FIG. 1. FIG. 1 is a block diagram of a modulation device according to an embodiment of the present invention. The modulation device includes an electrical signal generator 14 for generating a first modulation signal and a second modulation signal. The electrical signal generator 14 includes a radio-frequency (RF) signal generator 10 and a phase shift device 12. The phase shift device 12 can receive the first modulation signal from the RF signal generator 10 and shift the phase of the first modulation signal by 90 degrees to generate the second modulation signal. The modulation device further includes a laser diode 16 for generating an optical signal; and an integrated modulator 24 for receiving and modulating the optical signal to an output optical signal with quadruple frequency. The integrated modulator 24 includes three modulation units 18, 20, and 22. When the first modulation unit 18 receives the optical signal and the first modulation signal, it can be biased at the maximum transmission point, which forces the optical signal in maximum transmission value. Accordingly, the first modulation unit 18 modulates the optical signal according to the first modulation signal to generate a first optical signal. When the second modulation unit 20 receives the optical signal and the second modulation signal, it can be biased at the maximum transmission point, which forces the optical signal in maximum transmission value. Accordingly, the second modulation unit 20 modulates the optical signal according to the second modulation signal to generate a second optical signal. When the third modulation unit 22 receives the first optical signal and second optical signal, it can be biased at the minimum transmission point, which forces the first and second optical signals in minimum transmission value, to introduce an output optical signal with quadruple frequency. In practice, the integrated modulator 24 can be implemented by a commercial Mach-Zehnder modulator (MZM). Please note that, the MZM modulator is considered well known in the pertinent art and only an example of the integrated modulator 24, and is not meant to be taken as limitations. That is, as will be easily observed by a personal of ordinary skill in the art, other embodiments of the present disclosure utilizing different type of modulator are also possible.

Furthermore, the modulation device can connect two same integrated modulators in series. When one integrated modulator outputs a quadruple-frequency output optical signal based on the above-mentioned method, the other integrated modulator can receive that output optical signal and modulate it to generate an octuple-frequency output optical signal.

The modulation method in the present invention provides a frequency quadrupling technique by utilizing a signal integrated modulator. Provided that substantially the same result is achieved, the steps of the following description need not be in the exact order shown and need not be contiguous, that is, other steps can be intermediate. First, utilize the RF signal generator 10 to generate the first modulation signal, wherein the first modulation signal is a RF signal. The phase shift device 12 can receive the first modulation signal and shift the phase of the first modulation signal by 90 degrees to generate the second modulation signal. Secondly, send the first and second modulation signal into the first modulation unit 18 and the second modulation unit 20, respectively. The first and second modulation unit 18 and 20 can receive the optical signal from the laser diode 16. Third, the first and second modulation unit 18 and 20 are biased at the maximum transmission point, which forces the optical signal in maximum transmission value. Accordingly, the first and second modulation unit 18, 20 modulate the optical signal according to the first and second modulation signals respectively to generate the first optical signal and the second optical signal. Lastly, utilize the third modulation unit 22 to receive the first optical signal and second optical signal. Then the third modulation unit 22 is biased at the minimum transmission point, which forces the first and second optical signals in minimum transmission value, to introduce an output optical signal with quadruple frequency. In this step, the undesired optical sideband can be removed and the signal-to-noise ratio (SNR) is improved without any optical filter. Since no optical filter is required, the modulation method in the present invention is particularly attractive for WDM RoF systems.

Furthermore, the modulation method in the present invention can connect two same integrated modulators in series. When one integrated modulator outputs a quadruple-frequency output optical signal based on the above-mentioned method, the other integrated modulator can receive that output optical signal and modulate it to generate an octuple-frequency output optical signal.

The feasibility of the present invention is detailed by the mathematical model as follows. When the optical field of the optical signal is defined as $E_{in}(t)=\sqrt{2}E_0 \cos(\omega_0 t)$, the first modulation signal is $V_a(t)=V_m \cos(\omega_{RF} t)$, and the second modulation signal is $V_b(t)=V_m \cos(\omega_{RF} t+\pi/2)$, the optical field of the first optical signal will be $E_{out-a}(t)=E_0 \cos[\pi V_m/2V_\pi \cos(\omega_{RF} t)]\cdot\cos(\omega_0 t)$, and the optical field of the second optical signal will be $E_{out-b}(t)=-E_0 \cos[\pi V_m/2V_\pi \sin(\omega_{RF} t)]\cdot\sin(\omega_0 t)$. When the third modulation unit 22 is biased at value of $V_\pi$, which indicates the first and second optical signals have the minimum transmission points, the optical field of the output optical signal is $E_{out}(t)=2E_0\{J_2(m)\cos[(\omega_0+2\omega_{RF})t]+J_2(m)\cos[(\omega_0-2\omega_{RF})t]+J_6(m)\cos[(\omega_0+6\omega_{RF})t]+J_6(m)\cos[(\omega_0-6\omega_{RF})t]+J_{10}(m)\cos[(\omega_0+10\omega_{RF})t]+J_{10}(m)\cos[(\omega_0-10\omega_{RF})t]+\ldots$. Here, $m=\pi V_m/2V_\pi$. If the first modulation signal is a microwave or millimeter-wave signal, the output optical signal will be a quadruple-frequency microwave or millimeter-wave signal after received by the optical detector. Therefore, the present invention can be applied in the wireless communication so as to reduce the requirement of bandwidth.

Figure 2:
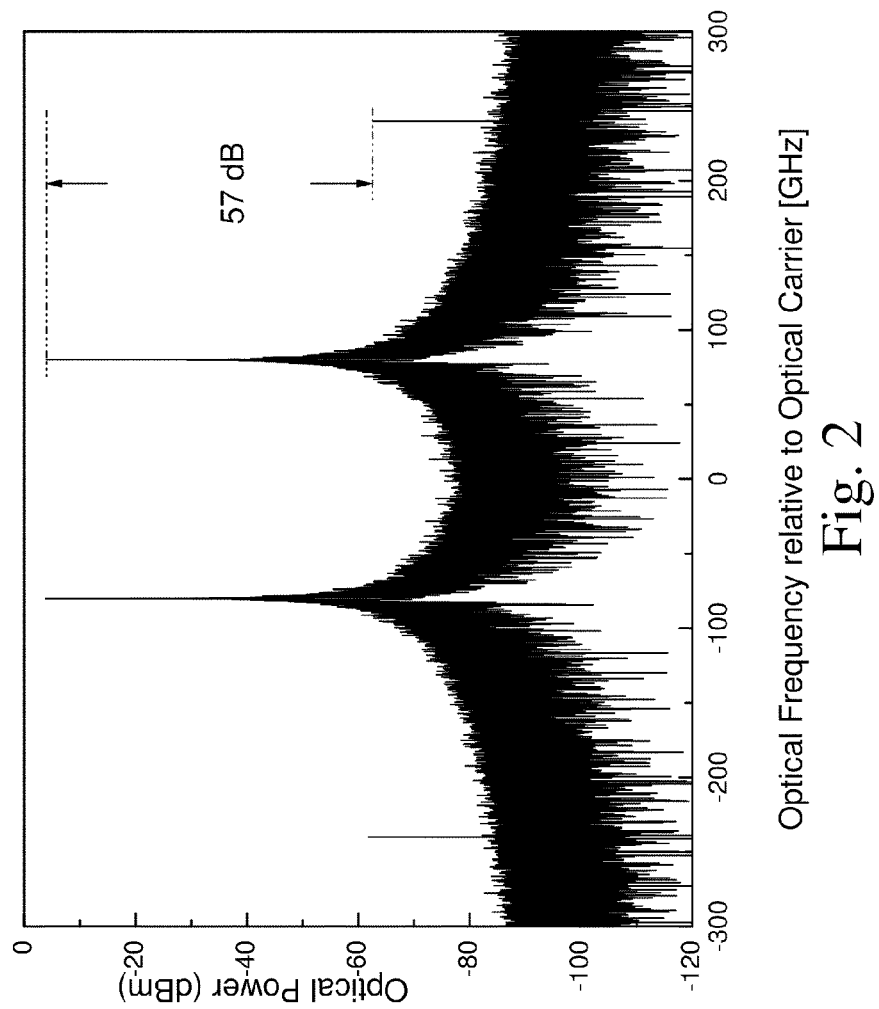
FIG. 2 is a diagram schematically showing the optical spectrum of a quadruple-frequency millimeter-wave signal generated by the modulation device of the present invention.
Figure 3:
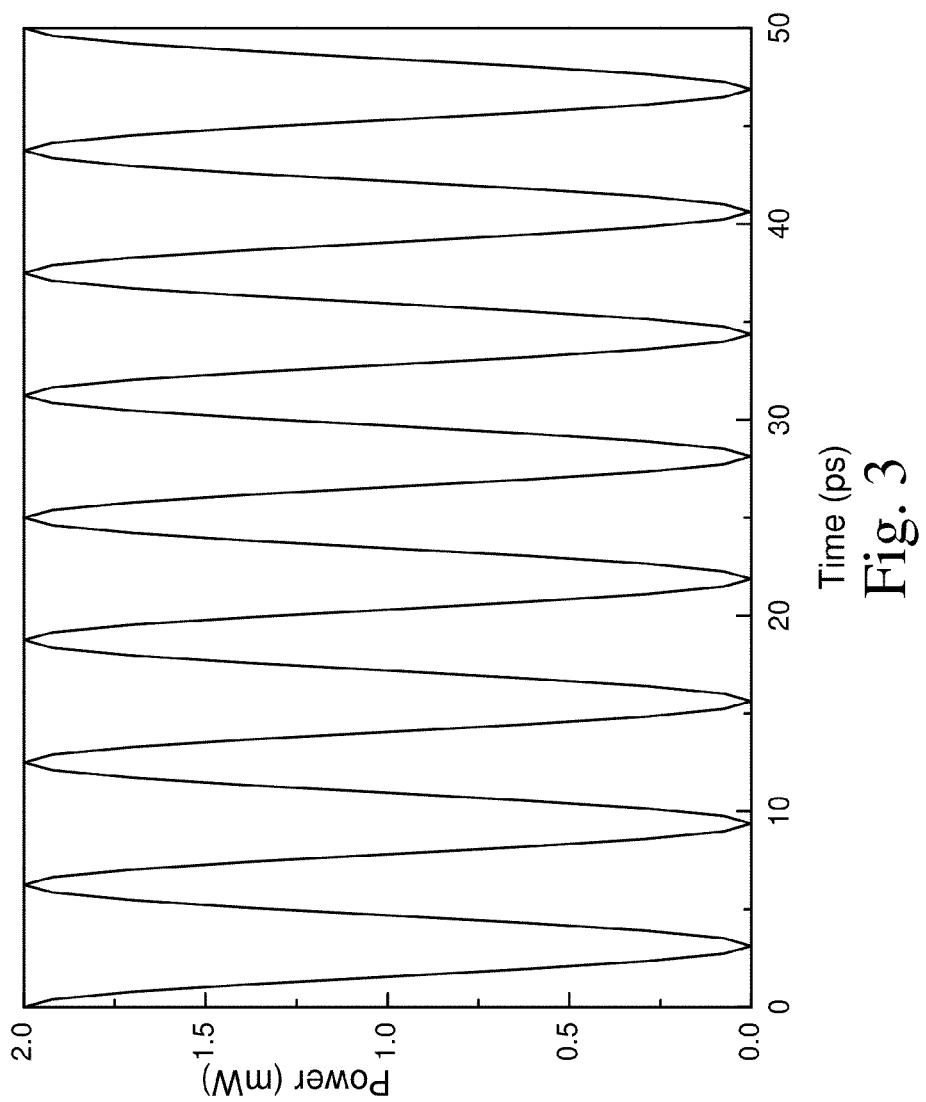
FIG. 3 is a diagram schematically showing the optical waveform of a quadruple-frequency millimeter-wave signal generated by the modulation device of the present invention.
Figure 4:
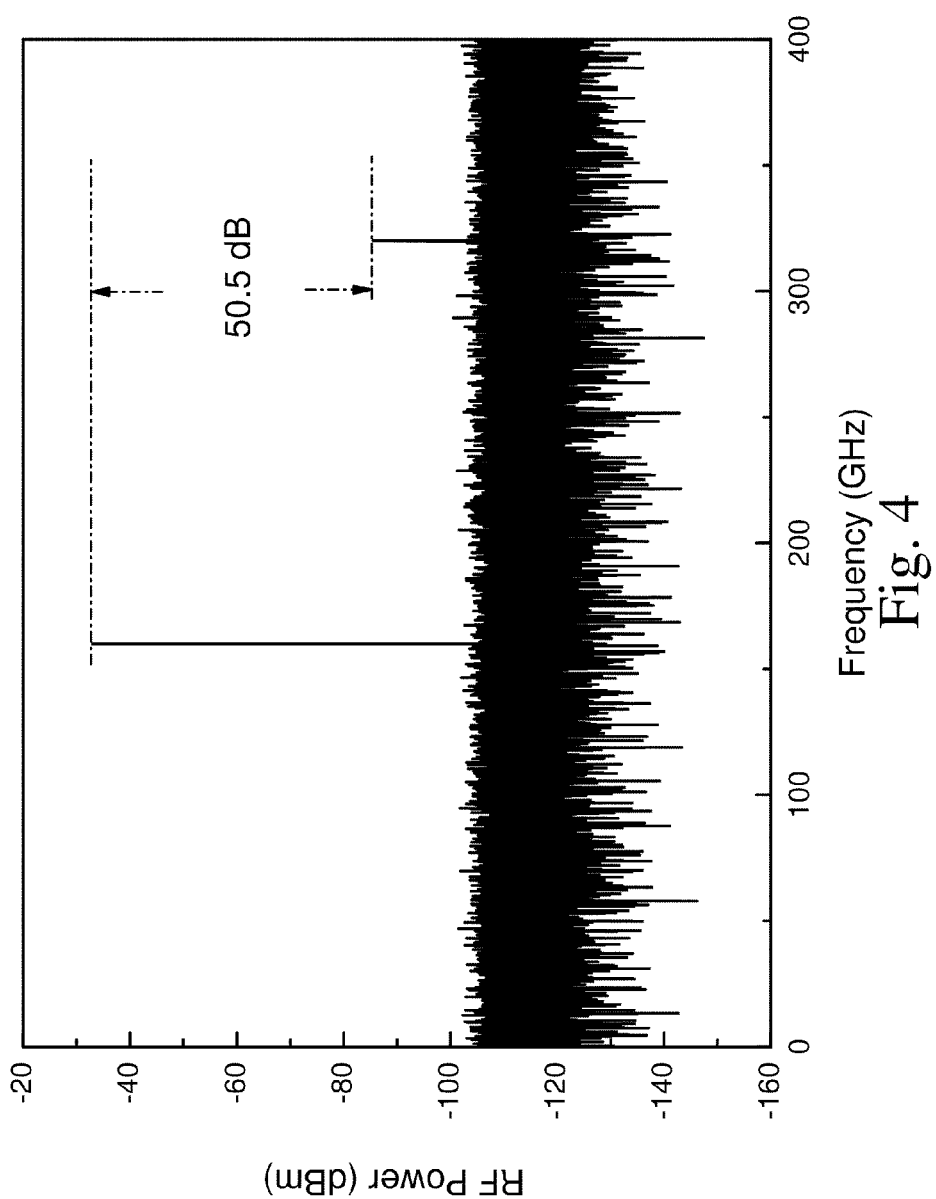
FIG. 4 is a diagram schematically showing the electrical spectrum of a quadruple-frequency millimeter-wave signal generated by the modulation device of the present invention.

Here, commercially available simulation software (e.g. VPI WDMTransmission Maker©) can be employed to verify the performance of the modulation device in the present invention. Assume that the RF signal generator 10 outputs an electrical signal with a frequencies range of 40 GHz. Please refer to FIG. 2. FIG. 2 is a diagram schematically showing the optical spectrum of a quadruple-frequency millimeter-wave signal generated by the modulation device of the present invention. As shown in FIG. 2, the frequency difference between two strongest signals is about 160 GHz. FIG. 3 is a diagram schematically showing the optical waveform of a quadruple-frequency millimeter-wave signal generated by the modulation device of the present invention. As shown in FIG. 3, the optical waveform of the quadruple-frequency millimeter-wave signal has 160 GHz frequency. Furthermore, FIG. 4 is a diagram schematically showing the electrical spectrum of a quadruple-frequency millimeter-wave signal generated by the modulation device of the present invention, wherein the frequency of the strongest signal is about 160 GHz. Therefore, based on the mathematic model and the simulation software, the modulation device in the present invention can efficiently provide the feasible millimeter-wave signal with quadruple frequency.

In contrast to the related art modulation schemes, the modulation device in the present invention can generate the quadruple-frequency optical signal with only a single integrated modulator. Therefore, the present invention can simplify the structure of the related art circuit and dramatically reduces the total manufacturing cost.

Those described above are only the preferred embodiments to exemplify the present invention but not to limit the scope of the present invention. Any equivalent modification or variation according to the shapes, structures, features and spirit disclosed in the specification is to be also included within the scope of the present invention.

What is claimed is:

1. A modulation device for generating an optical signal with multiple frequency, which is used to be implemented in a wavelength-division-multiplexer (WDM) system, said modulation device comprising:
    an electrical signal generator for generating a first modulation signal and a second modulation signal, wherein a phase difference between said first modulation signal and said second modulation signal is 90 degree;
    an optical signal generator for generating an optical signal; and
    a first integrated modulator for receiving said optical signal and modulating said optical signal to a first output optical signal with multiple frequency, said first integrated modulator comprising:
    a first modulation unit for receiving said optical signal and said first modulation signal, and modulating said optical signal according to said first modulation signal while said first modulation unit is biased to transmit said optical signal in maximum value;
    a second modulation unit for receiving said optical signal and said second modulation signal, and modulating said optical signal according to said second modulation signal while said first modulation unit is biased to transmit said optical signal in maximum value; and
    a third modulation unit for receiving said first modulation signal and said second modulation signal, and generating said first output optical signal with multiple frequency while said third modulation unit is biased to transmit said first optical signal and said second optical signal in minimum value.

2. The modulation device of claim 1, wherein said electrical signal generator comprises:
    a RF signal generator for generating said first modulation signal; and
    a phase shifter for receiving said first modulation signal and shifting a phase of said first modulation signal by 90 degrees to generate said second modulation signal.

3. The modulation device of claim 1, wherein said first modulation signal is a microwaves signal.

4. The modulation device of claim 3, wherein said microwaves signal is a millimeter-wave signal.

5. The modulation device of claim 1, wherein said first modulation signal is a RF (radio-frequency) signal.

6. The modulation device of claim 1, wherein said optical signal is from a laser light source.

7. The modulation device of claim 1, wherein said optical signal generator is a laser diode.

8. The modulation device of claim 1, wherein said first output optical signal is an optical signal with quadruple frequency.

9. The modulation device of claim 1, wherein when a optical field of said optical signal is $E_{int}(t)=\sqrt{2}E_0 \cos(\omega_0 t)$, said first modulation signal is $V_a(t)=V_m \cos(\omega_{RF} t)$, and said second modulation signal is $V_b(t) V_m \cos(\omega_{RF} t+\pi/2)$, a optical field of said first optical signal is $E_{out-a}(t)=E_0 \cos[\pi V_m/2V_\pi \cos(\omega_{RF} t)] \cdot \cos(\omega_0 t)$, and a optical field of said second optical signal is $E_{out-b}(t)=-E_0 \cos[\pi V_m/2V_\pi \sin(\omega_{RF} t)] \cdot \sin(\omega_0 t)$, and when said third modulation unit is biased at value of $V_\pi$, a optical field of said first output optical signal is $E_{out}(t)= 2E_0\{J_2(m)\cos\lfloor(\omega_0+2\omega_{RF})\rfloor t]+J_2(m)\cos\lfloor(\omega_0-2\omega_{RF})t\rfloor+J_6(m) \cos\lfloor(\omega_0+6\omega_{RF})t\rfloor+J_6(m)\cos[(\omega_0-6\omega_{RF})t]+J_{10}(m)\cos[(\omega_0+10_{RF})t]+J_{10}(m)\cos[(\omega_0-10\omega_{RF})t]+\ldots$, and $m=\pi V_m/2V_\pi$.

10. The modulation device of claim 1, further comprising a second integrated modulator coupled to said first integrated modulator, wherein said second integrated modulator has identical electrical components and structure with said first integrated modulator, and when said first integrated modulator outputs said first output optical signal with quadruple frequency, said second integrated modulator receives and modulate said first output optical signal to generate a second output optical signal with octuple-frequency.

11. A modulation method for generating an optical signal with multiple frequency, which is used to be implemented in a wavelength-division-multiplexer (WDM) system, said modulation method comprising:
    receiving and transmitting an optical signal in a maximum value;
    generating a first modulation signal and a second modulation signal, wherein a phase difference between said first modulation signal and said second modulation signal is 90 degrees;
    modulating said optical signal according to said first modulation signal using a first modulation unit to generate a first optical signal, while said first modulation unit is biased to transmit said optical signal in maximum value;
    modulating said optical signal according to said second modulation signal using a second modulation unit to generate a second optical signal, while said first modulation unit is biased to transmit said optical signal in maximum value; and
    transmitting said first optical signal and second optical signal in the minimum value from a third modulation unit to generate a first output optical signal having a frequency of a multiple of a frequency of said first modulation signal or said second modulation signal, respectively.

12. The modulation method of claim 11, wherein said first modulation signal is a microwaves signal.

13. The modulation method of claim 12, wherein said microwaves signal is a millimeter-wave signal.

14. The modulation method of claim 11, wherein said first modulation signal is RF (radio-frequency) signal.

15. The modulation method of claim 11, wherein said optical signal is from a laser light source.

16. The modulation method of claim 11, wherein said first output optical signal is an optical signal with quadruple frequency.

17. The modulation method of claim 11, wherein when a optical field of said optical signal is $E_{int}(t)=\sqrt{2}E_0 \cos(\omega_0 t)$, said first modulation signal is $V_a(t)=V_m \cos(\omega_{RF} t)$, and said second modulation signal is $V_b(t) V_m \cos(\omega_{RF} t+\pi/2)$, a optical field of said first optical signal is $E_{out-a}(t)=E_0 \cos[\pi V_m/2V_\pi \cos(\omega_{RF} t)] \cdot \cos(\omega_0 t)$, and a optical field of said second optical signal is $E_{out-b}(t)=-E_0 \cos[\pi V_m/2V_\pi \sin(\omega_{RF} t)] \cdot \sin(\omega_0 t)$, and when said third modulation unit is biased at value of $V_\pi$, a optical field of said first output optical signal is $E_{out}(t)= 2E_0\{J_2(m)\cos\lfloor(\omega_0+2\omega_{RF})\rfloor t]+J_2(m)\cos\lfloor(\omega_0-2\omega_{RF})t\rfloor+J_6(m) \cos\lfloor(\omega_0+6\omega_{RF})t\rfloor+J_6(m)\cos[(\omega_0-6\omega_{RF})t]+J_{10}(m)\cos[(\omega_0+10_{RF})t]+J_{10}(m)\cos[(\omega_0-10\omega_{RF})t]+\ldots$, and $m=\pi V_m/2V_\pi$.

18. The modulation method of claim 11, wherein the step (A) and the step (B) are performed in an integrated modulator.

19. The modulation method of claim 11, further comprising:
    (C) receiving and modulating said first output optical signal to generate a second output optical signal with octuple-frequency.

* * * * *